United States Patent
Lee

(10) Patent No.: US 9,148,965 B2
(45) Date of Patent: Sep. 29, 2015

(54) DISPLAY MODULE WITH HINGE SIGNAL PASSAGE AND ELECTRONIC DEVICE THEREOF

(71) Applicant: AU Optronics Corporation, Hsin-Chu (TW)

(72) Inventor: Keng-Yi Lee, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 224 days.

(21) Appl. No.: 13/926,105

(22) Filed: Jun. 25, 2013

(65) Prior Publication Data
US 2014/0049895 A1    Feb. 20, 2014

(30) Foreign Application Priority Data
Aug. 14, 2012 (TW) .............................. 101129334 A

(51) Int. Cl.
| G06F 1/16 | (2006.01) |
| H05K 5/00 | (2006.01) |
| H01R 12/79 | (2011.01) |

(52) U.S. Cl.
CPC ............ *H05K 5/0017* (2013.01); *G06F 1/1681* (2013.01); *G06F 1/1683* (2013.01); *H01R 12/79* (2013.01)

(58) Field of Classification Search
CPC .................................................... G06F 1/1683
USPC ..................................................... 361/679.28
See application file for complete search history.

(56) References Cited

U.S. PATENT DOCUMENTS
2011/0128722 A1    6/2011    Pan et al.

FOREIGN PATENT DOCUMENTS

| CN | 2817302 | 9/2006 |
| JP | 2004319585 | 11/2004 |
| TW | 200623157 | 7/2006 |
| TW | I292519 | 1/2008 |
| TW | M340554 | 9/2008 |
| TW | M403087 | 5/2011 |
| TW | 201118470 | 6/2011 |
| TW | I357799 | 2/2012 |

OTHER PUBLICATIONS

English translation of abstract of CN 2817302 (published Sep. 13, 2006).

(Continued)

*Primary Examiner* — Anthony Q Edwards
(74) *Attorney, Agent, or Firm* — McClure, Qualey & Rodack, LLP

(57) ABSTRACT

A display module and an electronic device are provided. The display module includes a housing, a pivot rod, and a flexible circuit board. The housing has a connection portion, wherein the connection portion has a connecting hole. The pivot rod is partially disposed in the connecting hole. The flexible circuit board includes a first transmission section, a second transmission section, and a connecting section that connects the previous two sections. The connecting section is disposed in a traverse direction with respect to the extending directions of the first transmission section and the second transmission section and wraps around the pivot rod with the traverse direction as an axial direction, wherein the connecting section is at least partially disposed in the connecting hole such that the first transmission section is in the housing and the second transmission section is outside of the housing.

22 Claims, 10 Drawing Sheets

(56) References Cited

OTHER PUBLICATIONS

English translation of abstract of JP 2004319585 (published Nov. 11, 2004).
English translation of abstract of TW I357799 (published Feb. 1, 2012).
English translation of abstract of TW M340554 (published Sep. 11, 2008).
Taiwan Office Action dated May 27, 2015.

DISPLAY MODULE WITH HINGE SIGNAL PASSAGE AND ELECTRONIC DEVICE THEREOF

BACKGROUND OF THE INVENTION

1. Field of the Invention

The present invention generally relates to a display module and an electronic device thereof; particularly, the present invention relates to a display module and an electronic device thereof that can utilize limited space to conduct signal transmission.

2. Description of the Related Art

In recent years, flat panel display modules have been widely used in various industries, being used as a television display or being embedded with electronic devices to display data. There are numerous types of flat panel display modules. Among them, flat panel liquid crystal displays are presently the most common. In addition, in coordination with the functional requirements of the electronic device, the flat panel display module is often disposed at different positions on the electronic device.

In terms of the conventional laptop computer as an example and as shown in FIG. 1, in addition to the flat panel display module 1 there is a main body 2, wherein the flat panel display module 1 is connected to the main body 2 in a hinged manner such that the flat panel display module 1 may be opened and closed with respect to the main body 2. In terms of the hinged section, two protrusion portions 3 will extend towards the flat panel display module 1 from the housing of the main body 2 of the conventional laptop computer, wherein a space gaps the two protrusion portions. A connection portion 5 extends from the flat panel display module 1 towards the main body 2 and is accommodated in the gap between the two protrusion portions 3. A side of the connection portion 5 will be hinge connected to one of the protrusion portions 3 by a pivot rod such that the flat panel display module 1 can open and close with respect to the main body 2. A communicable hole is disposed between the connection portion 5 and the other protrusion portion 3 such that wiring from inside the main body 2 can be installed into the flat panel display module 1 through this communicable hole.

However, in terms of the present design process of emphasizing thin and simple products under the pretense that the complexity of the circuit wiring should not decrease, the space for installing signal communication wiring between the flat panel display module 1 and the main body 2 may not be as abundant previously.

SUMMARY OF THE INVENTION

It is an object of the present invention to provide an electronic device and a display module that can decrease the space required for signal transmission wiring.

It is another object of the present invention to provide an electronic device and a display module that can utilize the space between the hinge joint to install signal transmission wiring.

The display module includes a housing, a pivot rod, and a flexible circuit board, wherein the housing has a connection portion extending out and the connection portion has a connecting hole. The pivot rod is partially disposed in the connecting hole, wherein the portion not disposed in the connecting hole is used to hinge connect with the other housing. The flexible circuit board includes a first transmission section, a second transmission section, and a connecting section. A first end of the first transmission section and a second end of the second transmission section respectively connect onto the connecting section. The connecting section is disposed in a traverse direction with respect to the extending directions of the first transmission section and the second transmission section. In addition, the first transmission section and the second transmission section are disposed adjacent to each other without crossing each other.

The connecting section wraps around the pivot rod with the traverse direction as an axial direction. The portion of the connecting section wrapping around the pivot is partly extended into the connection portion and partly located outside of the connection portion such that the portion of the connecting section wrapping around the pivot rod must pass through the connecting hole. The portion of the connecting section connected to the first transmission section is positioned within the connection portion, allowing the first transmission section to be positioned within the housing such that the first transmission section can connect to the display panel. The portion of the connecting section connected to the second transmission section is positioned outside of the connection portion, allowing the second transmission section to be positioned outside of the housing such that the second transmission section can connect with other devices. Through this setup, the flexible circuit board may transmit signals from the housing to outside of the housing under the limited hinge space.

The electronic device includes the above mentioned display module and a body. A second housing of the body has a second connection portion corresponding to the mentioned connection portion, wherein the second connection portion has a second connecting hole and accommodates the end of the pivot rod extending out from the mentioned connection portion. Since the connecting section of the flexible circuit board is wrapped around the pivot rod, the connecting section may protrude out the connecting hole along with the pivot rod and enters from the second connecting hole into the second housing such that the second transmission section may be positioned within the second housing to connect with other components.

DETAILED DESCRIPTION OF THE PREFERRED EMBODIMENT

An electronic device and a display module are provided. In a preferred embodiment, the electronic device of the present invention is preferably a laptop computer. However, the electronic device may also be any other products having a hinge connection design, such as a handheld gaming machine, electronic readers, electronic dictionaries, digital cameras with display screens. The display module is preferably a liquid crystal display module. However, the display module may also be other forms of products, such as self-luminescent display panels and electrophoretic displays.

Figure 1:
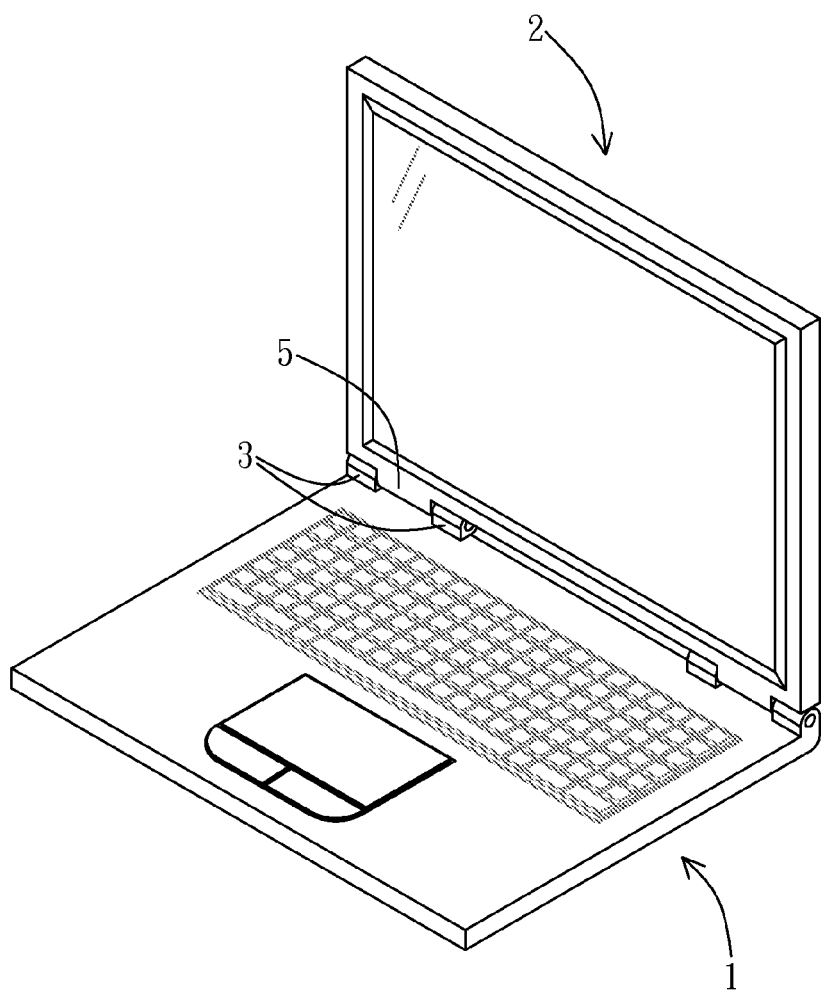
FIG. 1 is a schematic view of a conventional electronic device having a flat panel display module.
Figure 2:
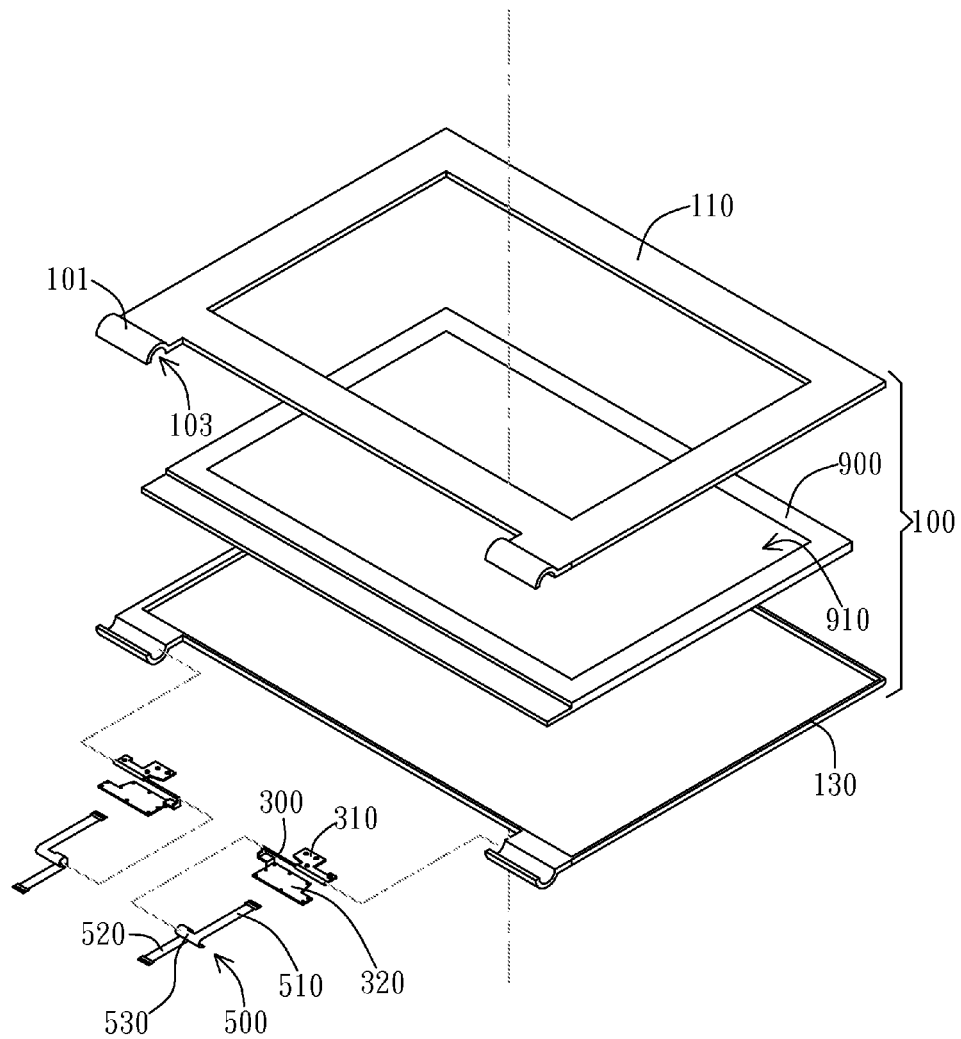
FIG. 2 is an exploded view of an embodiment of the display module of the present invention.

FIG. 2 illustrates an embodiment of the display module. As shown in FIG. 2, the display module includes a housing 100, a pivot rod 300, and a flexible circuit board 500. The housing 100 accommodates a display panel 900, wherein a connection portion 101 is preferably formed on an end of the housing 100. The connection portion 101 is preferably a protrusion portion protruding outwards from the end of the housing 100, wherein the connection portion 101 is hollow inside and has a connecting hole 103. In the present embodiment, the connection portion 101 protrudes out along the direction parallel to the display surface 910 of the display panel. However, in other different embodiments, the connection portion 101 may also protrude in a direction that is perpendicular to the display surface 910. The direction of opening of the connecting hole 103 is preferably parallel to the end of the housing 100 where the connection portion 101 is positioned. The connecting hole 103 connects as a through passage to a hollow area within the connection portion 101. In addition, in the present embodiment, the housing 100 is preferably assembled from a front frame 110 and a back plate 130. As shown in FIG. 2, the connection portion 101 is also respectively assembled from the front frame 110 and the back plate 130. In the present embodiment, the connection portion 101 is primarily used to hinge a main body section of a laptop computer. This portion will be further discussed later.

As shown in FIG. 2, the pivot rod 300 is partially disposed within the connecting hole 103, wherein an extending direction of the pivot rod 300 is preferably parallel to the end of the housing 100 where the connection portion 101 is positioned. An end of the pivot rod 300 that does not extend into the connecting hole 103 is used to connect to other housings (not illustrated) such that the display module will rotate to open or close with respect to the other housings due to the disposition of the pivot rod 300. In the present embodiment, two ends of the pivot rod 300 respectively have a first shaft seat 310 and a second shaft seat 320. The first shaft seat 310 is disposed in the connection portion 101 and connects on top of the housing 100 (ex. back plate 130). The second shaft seat 320 is connected with other housings. In the present embodiment, an end of the pivot rod 300 is fixedly connected on the second shaft seat 320. The other end of the pivot rod 300 is inserted into the shaft hole that is formed by the first shaft seat 310 such that the pivot rod 300 and the second shaft seat 320 can rotate with respect to the first shaft seat 310 and the housing 100.

Figure 3:
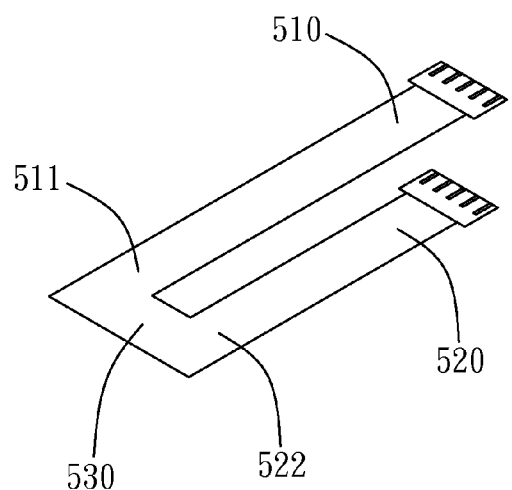
FIGS. 3 and 4 are different embodiments of the flexible circuit board.

As shown in FIGS. 2 and 3, the flexible circuit board 500 includes a first transmission section 510, a second transmission section 520, and a connecting section 530. A first end 511 of the first transmission section 510 and a second end 522 of the second transmission section 520 are respectively connected onto the connecting section 520, wherein the connecting section 530 traverses across the extending direction of the first transmission section 510 and the second transmission section 520. In other words, the flexible circuit board 500 will have a turn in the extending direction at the position where the first transmission section 510 connects to the connecting section 530. At the position where the second transmission section 520 connects with the connecting section 530, a turn in the extending direction will be also formed.

Figure 4:
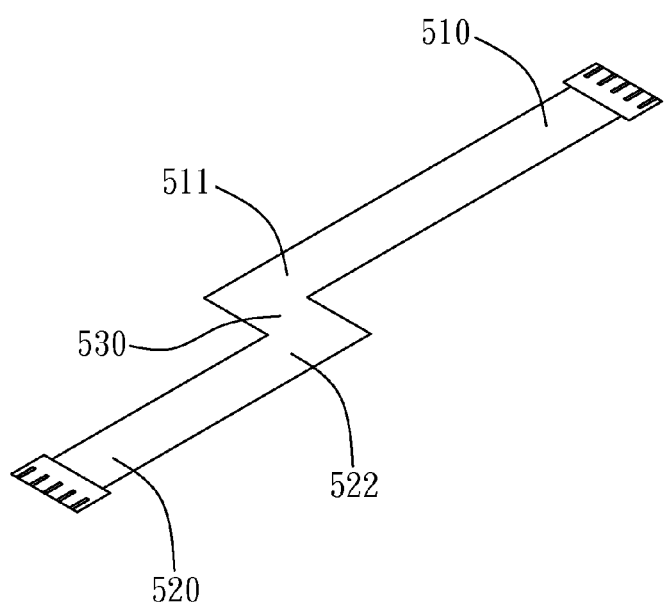

The first transmission section 510 and the second transmission section 520 are disposed adjacent to each other without traversing across each other. As shown in the embodiment illustrated in FIG. 3, the first transmission section 510 and the second transmission section 520 are disposed side-by-side and connect to a same side of the connecting section 530. The first transmission section 510 is preferably parallel with the second transmission section 520. However, in other different embodiments, the first transmission section 510 and the second transmission section 520 may be inclined to each other according to requirements of space design, of signal transmission, or of decreasing noise signals. FIG. 4 is another embodiment of the flexible circuit board 500. In the present embodiment, although the first transmission section 510 and the second transmission section 520 are adjacently disposed, they are disposed in a dislocated fashion with respect to each other along the extending direction. As shown in FIG. 4, the first end 511 of the first transmission section 510 and the second end 522 of the second transmission section 520 are respectively connected to opposite sides of the connecting section 530 such that a structure of lightning or "Z" shape is formed.

Figure 5:
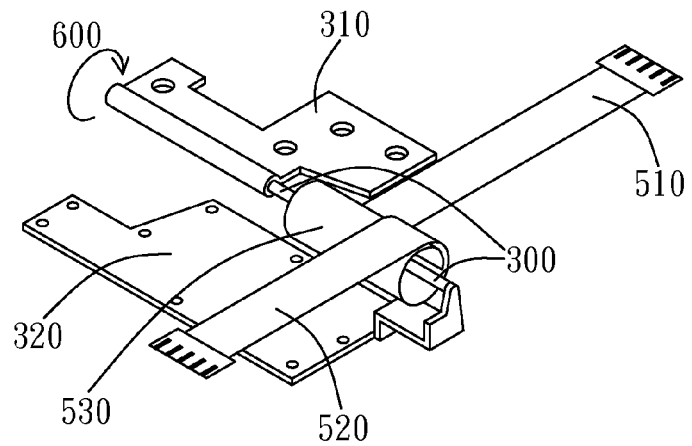
FIG. 5 is an embodiment of the flexible circuit board wrapping around the pivot rod.
Figure 6:
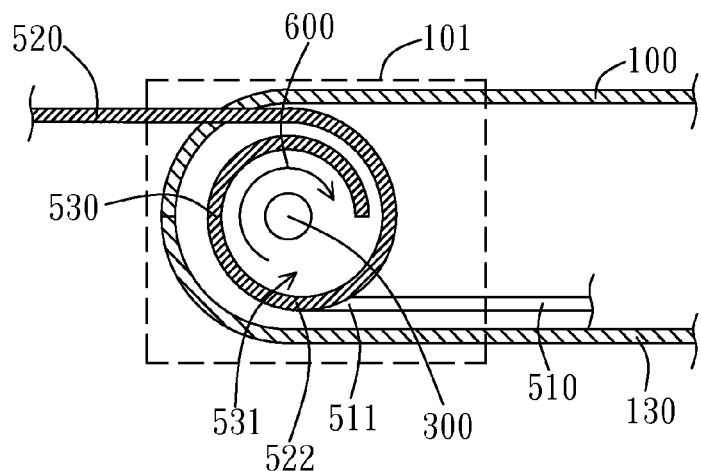
FIG. 6 is a cross-sectional view of the embodiment of FIG. 5.

As shown in FIGS. 5 and 6, the connecting section 530 wraps around the pivot rod 300 with a traverse direction across the first transmission section 510 and the second transmission section 520 as an axial direction. In other words, the connecting section 530 surrounds the mentioned axial direction to wrap into a tube shape structure, wherein at least a portion of the pivot rod 300 can be accommodated in a hole 531 formed by the tube structure. As shown in FIGS. 5 and 6, at least a portion of the connecting section 530 is disposed in the connecting hole 103. Preferably, the portion of the connecting section 530 wrapping around the pivot rod 300 is partly inserted into the connection portion 101 and partly disposed outside of the connection portion 101. Therefore, the portion that the connecting section 530 wraps around the pivot rod 300 must be able to pass through the connecting hole 103. In addition, in the present embodiment, the portion that the connecting section 530 connects to the first transmission section 510 is positioned within the connection portion 101 such that the first transmission section 510 is positioned within the housing 100 so that the first transmission section 510 may connect with the display panel 900. The portion that the connecting section 530 connects to the second transmission section 520 is positioned outside of the connection portion 101 such that the second transmission section 520 is outside of the housing 100 so that the second transmission section 520 may connect with other devices. Through this design, the flexible circuit board 500 may transmit signals from within the housing 100 to outside of the housing 100 under the limited hinge space.

In the embodiment in FIGS. 5 and 6, the connecting section 530 wraps around the pivot rod 300 such that the first end 511 of the first transmission section 510 is positioned between the pivot rod 300 and the back plate 130, wherein the first transmission section 510 extends from the first end 511 towards the direction into the housing 100. From another perspective, if viewing from the direction the pivot rod 300 extends out of the connection portion 101, a side of the connecting section 530 connecting to the first end 511 will rotate according to the right-hand rule. In other words, with the right thumb pointing in the same direction as the axial direction of the pivot rod 300, the curving direction of the other four fingers of the right hand represents the rotation direction of the side of the connecting section 530 connecting to the first end 511. In terms of laptop computers as an example, the housing 100 will usually be hinge connected to another housing or body (not shown). When users lift open the housing 100 to use, the housing 100 will rotate along an open rotational direction 600. If the connecting section 530 is wrapped according the above mentioned manner, when the pivot rod 300 rotates according to the open rotational direction 600, the pulling effect on the first transmission section 510 may be decreased.

In addition, since the first transmission section 510 and the second transmission section 520 are connected on the same side of the connecting section 530, the second transmission section 520 will also be positioned between the pivot rod 300 and the back plate 130 and will extend in the same direction. Since the second transmission section 520 needs to extend out of the housing 100, the second transmission section 520 will wrap around the pivot rod 300 according to the mentioned right-hand rule (i.e. opposite direction to the open rotational direction 600) and extend in a direction out of the housing 100.

Figure 7A:
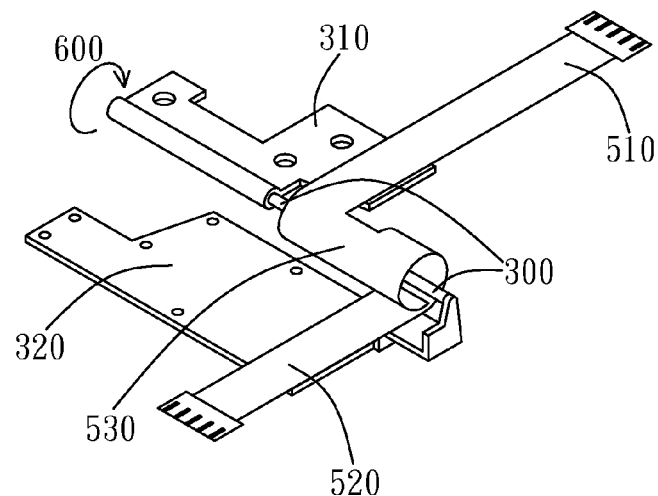
FIG. 7A is another embodiment of the flexible circuit board wrapping around the pivot rod.
Figure 7B:
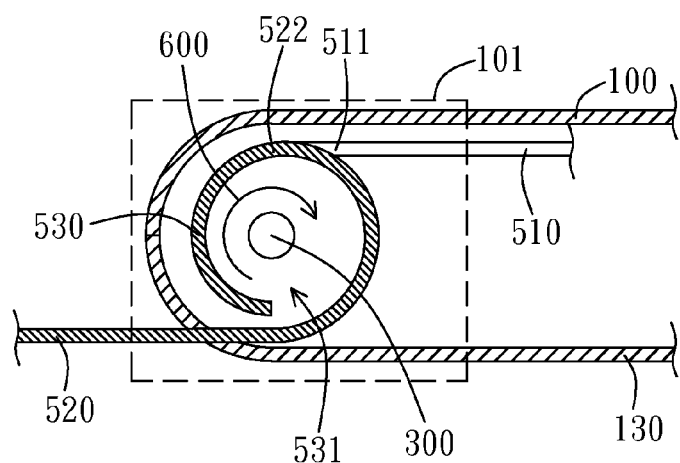
FIG. 7B is a cross-sectional view of the embodiment of FIG. 7A.

As shown in the embodiment in FIGS. 7A and 7B, the connecting section 530 is wrapped in the opposite direction. After the connecting section 530 wraps around the pivot rod 300, the second end 522 is positioned on the outer side of the pivot rod 300 with respect to the back plate 130, wherein the second transmission section 520 extends from the second end 522 in the direction away and out of the housing 100. In particular, the second transmission section 520 extends out from the second end 522, rotating around the pivot rod 300 to between the pivot rod 300 and the back plate 130 (i.e. wrapping around the pivot rod 300 along the open rotational direction 600), and then extending out of the housing 100 from between the pivot rod 300 and the back plate 130. From another perspective, if viewing from the direction of the pivot rod 300 extending out of the connection portion 101, the side that the connecting section 530 connects to the second end 522 will satisfy the left-hand rule of rotation. That is, with the left thumb pointing at the axial direction of the pivot rod 300, the curving direction of the other four fingers of the left hand represents the wrapping direction of the connecting section 530 to a side of the second end 522. In terms of a laptop computer as an example, the housing 100 is typically hinge connected to another housing or body (not shown). When users flip open the housing 100 to use, the housing 100 will rotate along the open rotational direction 600. If the connecting section 530 is wrapped in the above mentioned manner, then the pulling effect on the second transmission section 520 may be decreased when the pivot rod 300 rotates along the open rotational direction 600. From another perspective, when the side of the connecting section 530 connecting to the second end 522 wraps around the pivot rod 300 along the open rotational direction 600, the pulling effect on the second transmission section 520 may be decreased when the housing 100 rotates along the open rotational direction 600.

In addition, since the first transmission section 510 and the second transmission section 520 are connected on the same side of the connecting section 530, the first end 511 will also be positioned on the outer side of the pivot rod 300 with respect to the back plate 130. The first end 511 will extend towards the direction into the housing 100 and connect with the housing 100.

Figure 8A:
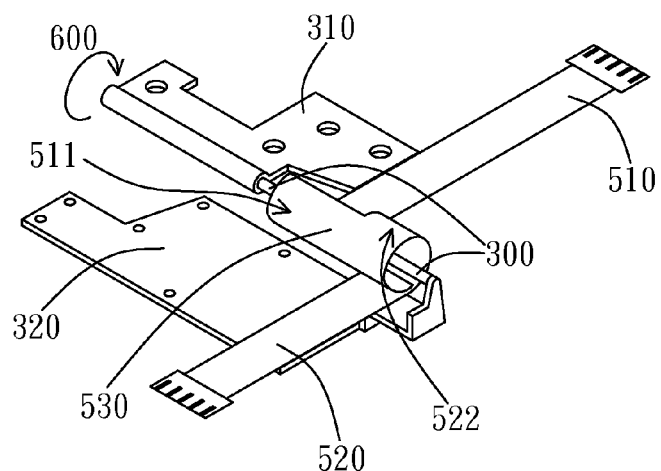
FIG. 8A is another embodiment of the flexible circuit board wrapping around the pivot rod.
Figure 8B:
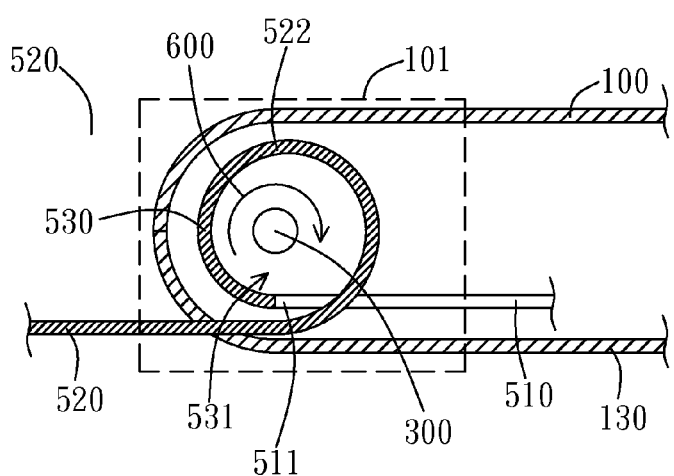
FIG. 8B is a cross-sectional view of the embodiment of FIG. 8A.

In the embodiment illustrated in FIGS. 8A and 8B, the first end 511 of the first transmission section 510 and the second end 522 of the second transmission section 520 respectively connect on opposite sides of the connecting section 530. In the present embodiment, the side of the connecting section 530 connecting to the first end 511 wraps around the pivot rod 300 in the opposite direction to the open rotational direction 600. Conversely, the other side that is the side that connected to the second end 522 wraps around the pivot rod 300 in the direction of the open rotational direction 600. Through this design, the pulling effect on the first transmission section 510 and the second transmission section 520 may be decreased when the pivot rod 300 rotates along the open rotational direction 600.

Figure 9A:
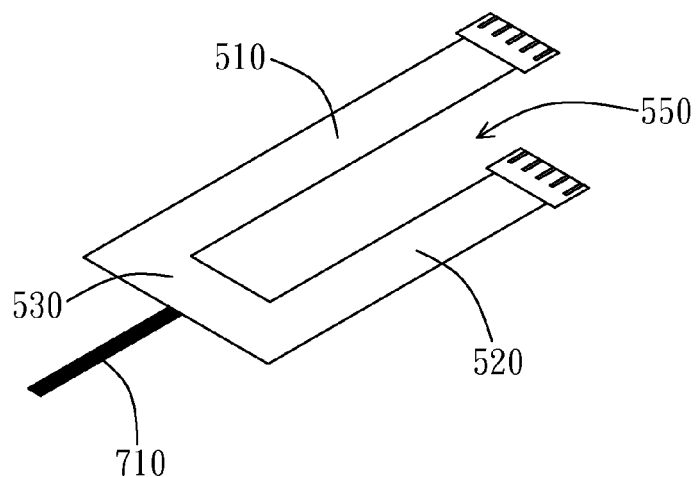
FIG. 9A is an embodiment of the flexible circuit board having the first tab.
Figure 9B:
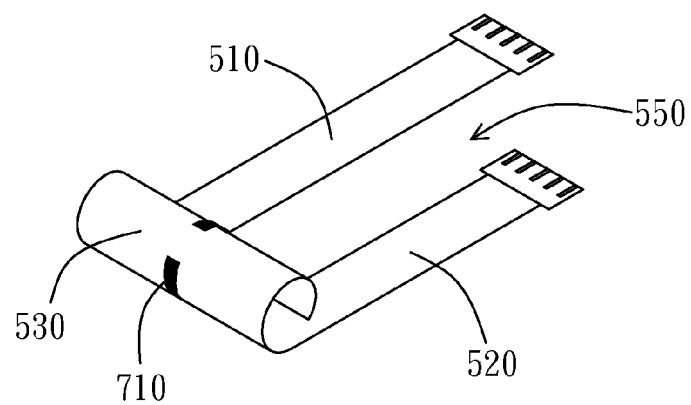
FIG. 9B is the embodiment of FIG. 9A in a used state.

As shown in FIGS. 9A and 9B, the first transmission section 510 and the second transmission section 520 are spaced by a gap 550, wherein the gap 550 may lay across the peripheral edge of the connecting hole 103. The connecting section 530 corresponding to the gap extends in a direction perpendicular to the connecting section 530 to form a first tab 710. When the connecting section 530 wraps around the pivot rod 300, the first tab 710 will overlap to an opposite side of the connecting section 530 to form an outer loop, securing or fixing a wrapping configuration of the connection section 530. The first tab 710 is preferably formed in one piece with the connecting section 530. However, in other different embodiments, the first tab 710 may be adhered to the connecting section 530 or may use any other external connecting methods to connect onto the connecting section 530.

Figure 9C:
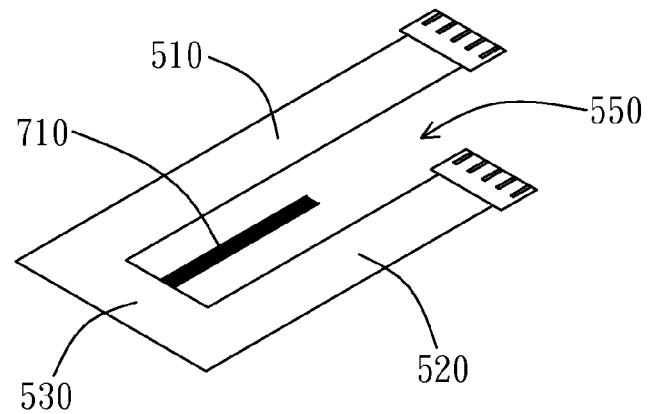
FIGS. 9C and 9D are other embodiments of the flexible circuit board having the first tab.
Figure 9D:
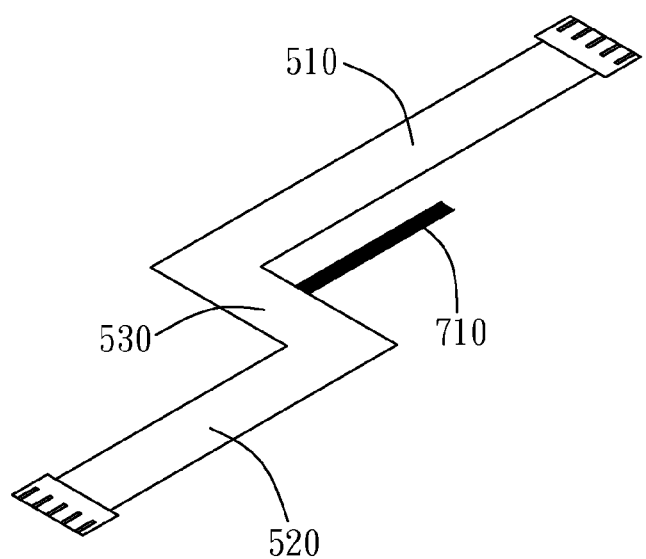

In the present embodiment, the first transmission section 510 and the second transmission section 520 are connected to the same side of the connecting section 530 while the first tab 710 is formed on the other side of the connection section 530. When the connecting section 530 is rolled, the first tab 710 will extend into the gap 550 and wrap around the outer side of the connecting section 530 to form the outer loop. However, in the embodiment shown in FIG. 9C, the first tab 710 may also be formed on the same side of the connecting section 530 as the first transmission section 510 and the second transmission section 520. In addition, as shown in FIG. 9D, when the first transmission section 510 and the second transmission section 520 are respectively connected to opposite sides of the connecting section 530, the first tab 710 may select to be on the same side as the first transmission section 510 or the second transmission section 520.

Figure 10A:
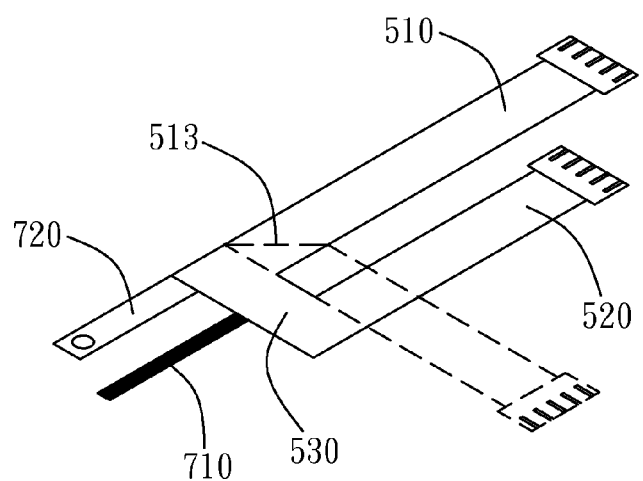
FIG. 10A is an embodiment of the flexible circuit board having the fold line and the second tab.

In the embodiment shown in FIG. 10A, a fold line 513 is formed on the first transmission section 510 at a position close to the first end 511. The fold line 513 is inclined with respect to the extending direction of the connecting section 530. In other words, the connecting section 530 traverses across the direction of the first transmission section 510 and the second transmission section 520, wherein the angle of inclination is preferably 45 degrees. However, any other angles may be used to satisfy requirements on the circuit path configurations. The first transmission section 510 folds along the fold line 513 so as to change the extending direction of the folded portion. When the angle between the fold line 513 and the connecting section 530 is 45 degrees, the extending direction of the first transmission section 510 after the folding will be parallel to the extending direction of the connecting section 530.

Figure 10B:
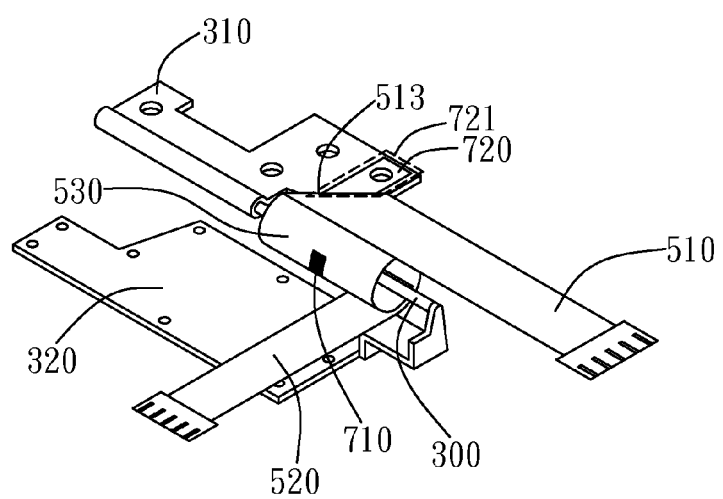
FIG. 10B is the embodiment of FIG. 10A in a used state.

In addition, in the embodiment shown in FIG. 10B, at the position corresponding to where the connecting section 530 connects to the first end 511, a second tab 720 is formed extending in a direction perpendicular to the connecting section 530. When the connecting section 530 wraps around the pivot rod 300, the second tab 720 will simultaneously wrap to a side of the connecting section 530 connected to the first end 511. Since the first transmission section 510 is already folded along the fold line 513, the original position before the folding will be exposed and form an exposed position 721. Since the fold line 513 is inclined with respect to the connecting section 530, the exposed position 721 will include a triangular or trapezoidal shape. After the second tab 720 wraps along with the connecting section 530, the second tab 720 will connect to the housing 100 in the exposed position 721. In the present embodiment, the first shaft seat 310 is disposed on the exposed position 721 and connects to the housing 100. The second tab 720 is connected to the first shaft seat 310 in order to connect to the housing 100, wherein the method of connection may include screwing, adhering, hot pressing, or any other methods. In the present embodiment, the same threading or connection pin may be used to simultaneously secure or connect the second tab 720 and the first shaft seat 310 onto the housing 100. In addition, the second tab 720 may also be directly connected on the housing 100 without going through the first shaft seat 310.

Figure 11:
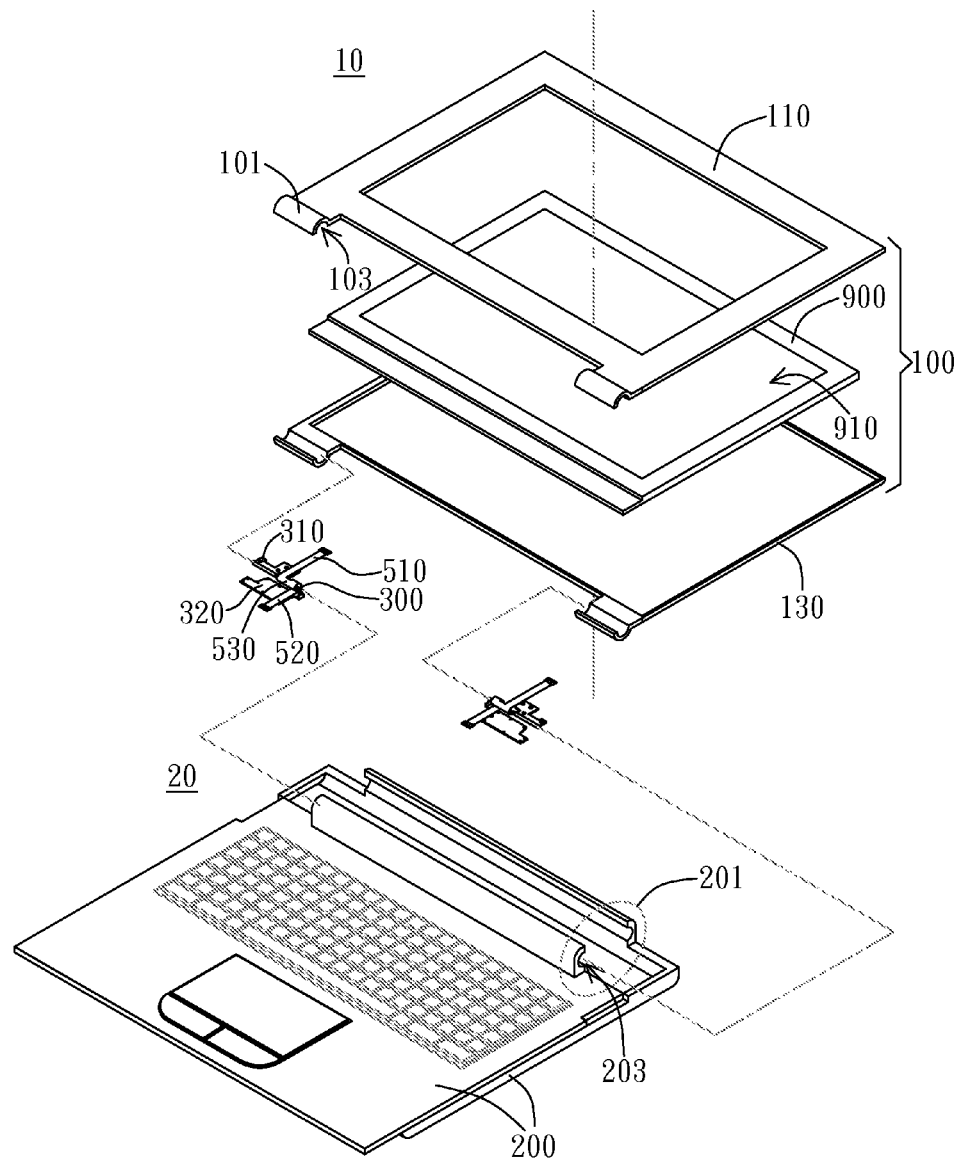
FIG. 11 is an exploded view of the electronic device of the present invention.

FIG. 11 illustrates an embodiment of the electronic device of the present invention. In the present embodiment, the electronic device is shown as a laptop computer. However, in other different embodiments, the electronic device may also be any other products having hinge joint connections, such as handheld gaming machines, electronic readers, electronic dictionaries, display screens of digital cameras, or any other related devices. As shown in FIG. 11, the electronic device includes a display module 10 and a body 20 respectively having a first housing 100 and a second housing 200. Other components of the electronic device are disposed in the body 20, such as processor, motherboard, or other components. The display module 10 is disposed according to the mentioned above embodiments, and therefore will not be elaborated hereinafter. Instead, the relevant component names, such as housing, connection portion, connecting hole, and such shall be described as first housing, first connection portion, and first connecting hole (they will have the same label numbers) to facilitate the explanations. In addition, the open rotational direction 600 mentioned previously will be the rotational direction of the pivot rod 300 when the user flips open the first housing 100 to use as the second housing 200 is stacked on the first housing 100.

As shown in FIG. 11, the second housing of the body 20 has a second connection portion 201 corresponding to the first connection portion 101. The second connection portion 201 has a second connecting hole 203 that corresponds to the first connecting hole 103, wherein the second connection portion 201 accommodates the pivot rod 300 protruding out of an end of the first connection portion 101. In addition, the previously mentioned second shaft seat 320 is also accommodated in the second connection portion 201 to secure the pivot rod 300 so that a hinge joint relationship may be formed between the first housing 100 and the second housing 200. Since the connecting section 530 of the flexible circuit board 500 wraps around the pivot rod 300, the connecting section 530 can pass out through the first connecting hole 103 along the pivot rod 300 and enter into the second housing 200 through the second connecting hole 203 such that the second transmission section 520 can be positioned within the second housing 200 to connect with other components. In other words, the connecting section 530 is formed as a bridge structure between the first transmission section 510 and the second transmission section 520, and over cross the peripheral edges of the first connecting hole 103 and the second connecting hole 203. Through the above setting, the flexible circuit board 500 may transmit signals between the first housing 100 and the second housing 200 within the confined space of the hinge joint support structure. In regards to the part about the second transmission section 520 extending away from the first housing 100 in the previous embodiment, the second transmission section 520 of the present embodiment will extend towards and into the second housing 200 to connect with the circuits inside the second housing 200 to perform signal transmissions.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A display module, comprising:
a housing having a connection portion, wherein the connection portion has a connecting hole;
a pivot rod partially disposed in the connecting hole; and
a flexible circuit board, comprising:
a first transmission section having a first end;
a second transmission section having a second end and being disposed adjacent to the first transmission section without traversing across the first transmission section; and
a connecting section disposed in a traverse direction with respect to the extending directions of the first transmission section and the second transmission section and connecting the first end and the second end; wherein the connecting section wraps around the pivot rod with the traverse direction as an axial direction and at least partially disposed in the connecting hole such that the first transmission section is in the housing and the second transmission section is outside of the housing, and the first transmission section and the second transmission section is spaced by a gap, the connecting section corresponding to the gap extends in a direction perpendicular to the connecting section to form a first tab; when the connecting section wraps around the pivot rod, the first tab wraps and overlaps around to an opposite side of the connecting section to secure a wrapping configuration of the connecting section.

2. The display module of claim 1, wherein the first transmission section and the second transmission section are disposed side-by-side and connected to a same side of the connecting section, the first tab extends out from one side of the connecting section opposite to the first transmission section and the second transmission section and extends into the gap during the wrapping.

3. The display module of claim 1, wherein a fold line inclined with respect to the connecting section is formed on the first transmission section at a position close to the first end, the first transmission section folds along the fold line so as to change the extending direction of the folded portion.

4. The display module of claim 3, wherein the connecting section extends in a direction opposite to the first end to form a second tab; when the connecting section wraps around the pivot rod, an end of the second tab wraps around to an exposed position that is exposed after folding of the first transmission section and connects to the housing at the exposed position.

5. The display module of claim 4, further comprising a shaft seat disposed at the connection portion and corresponding to the connecting hole, wherein the pivot rod is connected to the shaft seat and the second tab is connected to the shaft seat through the exposed position in order to connect to the housing.

6. The display module of claim 1, wherein the first transmission section and the second transmission section are disposed in alternating positions and respectively connect to opposite sides of the connecting section.

7. The display module of claim 1, wherein the first transmission section and the second transmission section are disposed side-by-side and both connect to a same side of the connecting section.

8. The display module of claim 1, wherein the housing includes a back plate, the first end is wrapped between the pivot rod and the back plate, and the first transmission section extends in a direction into the housing from the first end.

9. The display module of claim 1, wherein the housing includes a back plate, the second end is wrapped at the pivot rod corresponding to a side outside of the back plate, and the second transmission section extends from the second end in a direction away from the housing.

10. The display module of claim 1, wherein the pivot rod has an open rotational direction, one side of the connecting section connected to the second end wraps around the pivot rod according to the open rotational direction.

11. The display module of claim 10, wherein the second transmission section wraps around the pivot rod according to the open rotational direction in order to extend out in a direction away from the housing below the pivot rod.

12. An electronic device, comprising:
a first housing having a first connecting portion, wherein the first connection portion has a first connecting hole;
a second housing having a second connecting portion corresponding to the first connecting portion, wherein the second connecting portion has a second connecting hole, and the second connecting hole corresponds to the first connecting hole;
a pivot rod disposed in the first connecting hole and the second connecting hole to connect the first housing onto the second housing; and
a flexible circuit board, comprising:
a first transmission section having a first end;
a second transmission section disposed adjacent to the first transmission section without traversing across the first transmission section, wherein the second transmission section has a second end; and
a connecting section disposed in a traverse direction with respect to the extending directions of the first transmission section and the second transmission section and connects the first end and the second end; wherein the connecting section wraps around the pivot rod with the traverse direction as an axial direction and is disposed in the first connecting hole and the second connecting hole such that the first transmission section is in the first housing and the second transmission section is in the second housing, and the first transmission section and the second transmission section is spaced by a gap, the connecting section corresponding to the gap extends in a direction perpendicular to the connecting section to form a first tab; when the connecting section wraps around the pivot rod, the first tab wraps and overlaps around to an opposite side of the connecting section to secure a wrapping configuration of the connecting section.

13. The electronic device of claim 12, wherein the first transmission section and the second transmission section are disposed side-by-side and connected to a same side of the connecting section, the first tab extends out from one side of the connecting section opposite to the first transmission section and the second transmission section and extends into the gap during the wrapping.

14. The electronic device of claim 12, wherein a fold line inclined with respect to the connecting section is formed on the transmission section at a position close to the first end, the first transmission section folds along the fold line so as to change the extending direction of the folded portion.

15. The electronic device of claim 14, wherein the connecting section extends in a direction opposite to the first end to form a second tab; when the connecting section wraps around the pivot rod, an end of the second tab wraps around to an exposed position that is exposed after folding of the first transmission section and connects to the first housing at the exposed position.

16. The electronic device of claim 15, further comprising a shaft seat disposed at the first connection portion and corresponding to the first connecting hole, wherein the pivot rod is connected to the shaft seat and the second tab is connected to the shaft seat through the exposed position in order to connect to the first housing.

17. The electronic device of claim 12, wherein the first transmission section and the second transmission section are disposed in alternating positions and respectively connect to opposite sides of the connecting section.

18. The electronic device of claim 12, wherein the first transmission section and the second transmission section are disposed side-by-side and both connect to a same side of the connecting section.

19. The electronic device of claim 12, wherein the first housing includes a back plate, the first end is wrapped between the pivot rod and the back plate, and the first transmission section extends in a direction into the first housing from the first end.

20. The electronic device of claim 12, wherein the first housing includes a back plate, the second end is wrapped at the pivot rod corresponding to a side outside of the back plate, and the second transmission section extends from the second end in a direction towards inside the second housing.

21. The electronic device of claim 12, wherein the pivot rod has an open rotational direction, one side of the connecting section connected to the second end wraps around the pivot rod according to the open rotational direction.

22. The electronic device of claim 21, wherein the second transmission section wraps around the pivot rod according to the open rotational direction in order to extend out in the direction towards the second housing below the pivot rod.

* * * * *